(12) United States Patent
Fang et al.

(10) Patent No.: US 7,945,586 B1
(45) Date of Patent: May 17, 2011

(54) METHODS AND APPARATUS TO PROTECT DATA

(75) Inventors: Chao Fang, Nan Jing (CN); Yan Gu, Nan Jing (CN)

(73) Assignee: Trend Micro Incorporated, Tokyo (JP)

( * ) Notice: Subject to any disclaimer, the term of this patent is extended or adjusted under 35 U.S.C. 154(b) by 225 days.

(21) Appl. No.: 11/693,422

(22) Filed: Mar. 29, 2007

(51) Int. Cl.
*G06F 17/00* (2006.01)
(52) U.S. Cl. ......... 707/785; 707/786; 707/787; 707/788
(58) Field of Classification Search ........... 707/785–788
See application file for complete search history.

(56) References Cited

U.S. PATENT DOCUMENTS

| | | | |
|---|---|---|---|
| 6,985,588 B1 * | 1/2006 | Glick et al. | 380/258 |
| 7,107,285 B2 * | 9/2006 | von Kaenel et al. | 1/1 |
| 2004/0201765 A1 * | 10/2004 | Gammenthaler | 348/333.01 |

* cited by examiner

*Primary Examiner* — Sana Al-Hashemi
(74) *Attorney, Agent, or Firm* — IP Strategy Group, P.C.

(57) ABSTRACT

A computer-implemented method for providing protection for a data file is disclosed. The method includes employing allowable location information to control access to information of the data file, wherein the allowable location information is associated with the data file The information in the data file is inaccessible if a location of a computer employed to access the data file is not within an allowable geographic area defined by the allowable location information.

19 Claims, 4 Drawing Sheets

METHODS AND APPARATUS TO PROTECT DATA

BACKGROUND OF THE INVENTION

Traditionally, a workplace can be defined as one centralized location in which business or professional functions are performed. With the introduction and adaptations to information and communication technologies, the definition of the workplace continues to evolve. The definition of the traditional workplace is quickly being replaced with employees working anywhere they can be most efficient and productive, for example, at home, on an airplane, or at the office. With this increase in workplace locations per employee, the risk of unauthorized access to company confidential data also increases. Inhibiting unauthorized access to company confidential data inside or outside the company premises is a critical task for individuals and organizations alike.

One technique to inhibit the unauthorized access to company confidential data inside or outside the company premises involves the use of Security Policies. Security Policies are documents containing sets of regulations, which mandate how an organization will manage, protect and distribute company confidential information. For example, a security policy may state that an employee may not remove digital data from within the company premises.

Another technique to inhibit the unauthorized intrusions to company confidential data inside or outside the company premises may involve employing file encryption protection on the confidential data. File encryption protection is the process of encoding or decoding data so that individuals will be unable to read the data if they are not provided authorization to view the files. Authorization to view the files is generally granted by the application of passwords.

However, there are problems with the prior art Security Policy and File Encryption techniques. Security Policies can be very difficult and expensive to enforce Security Polices can be hard to enforce with regards to digital data because digital data can be relatively easy to download to small portable devices, such as, compact disks (CDs), Digital Video Disks (DVDs), and portable hard drives. Once downloaded, it is very difficult to detect whether a storage device, such as a CD, that is being carried in an employee's briefcase contains his favorite music or the company's latest engineering design. Even if the technology exists to perform the aforementioned detection, the level of intrusion and the impact on employee morale make such detection unpalatable for most companies.

With regards to file encryption, there are problems with this technique as well. As mentioned earlier, authorization to encrypted files often requires employing a password for decryption. The passwords can be easily lost, stolen or cracked, thereby compromising the security of the confidential data.

SUMMARY OF INVENTION

The invention relates, in an embodiment to a computer-implemented method for providing protection for a data file. The method includes employing allowable location information to control access to information of the data file, wherein the allowable location information is associated with the data file. The information in the data file is inaccessible if a location of a computer employed to access the data is not within an allowable geographic area defined by the allowable location information.

In another embodiment, the invention relates to a computer-implemented method for providing protection for information of a data file. The method includes ascertaining allowable location information from a protected file, the protected file representing a protected version of the data file, the allowable location information specifying a geographic area within which the protected file is accessible. The method also includes ascertaining a geographic location of a computer employed to access the protected file. The method further includes rendering, if the geographic location is within the geographic area, the information of the data file accessible.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
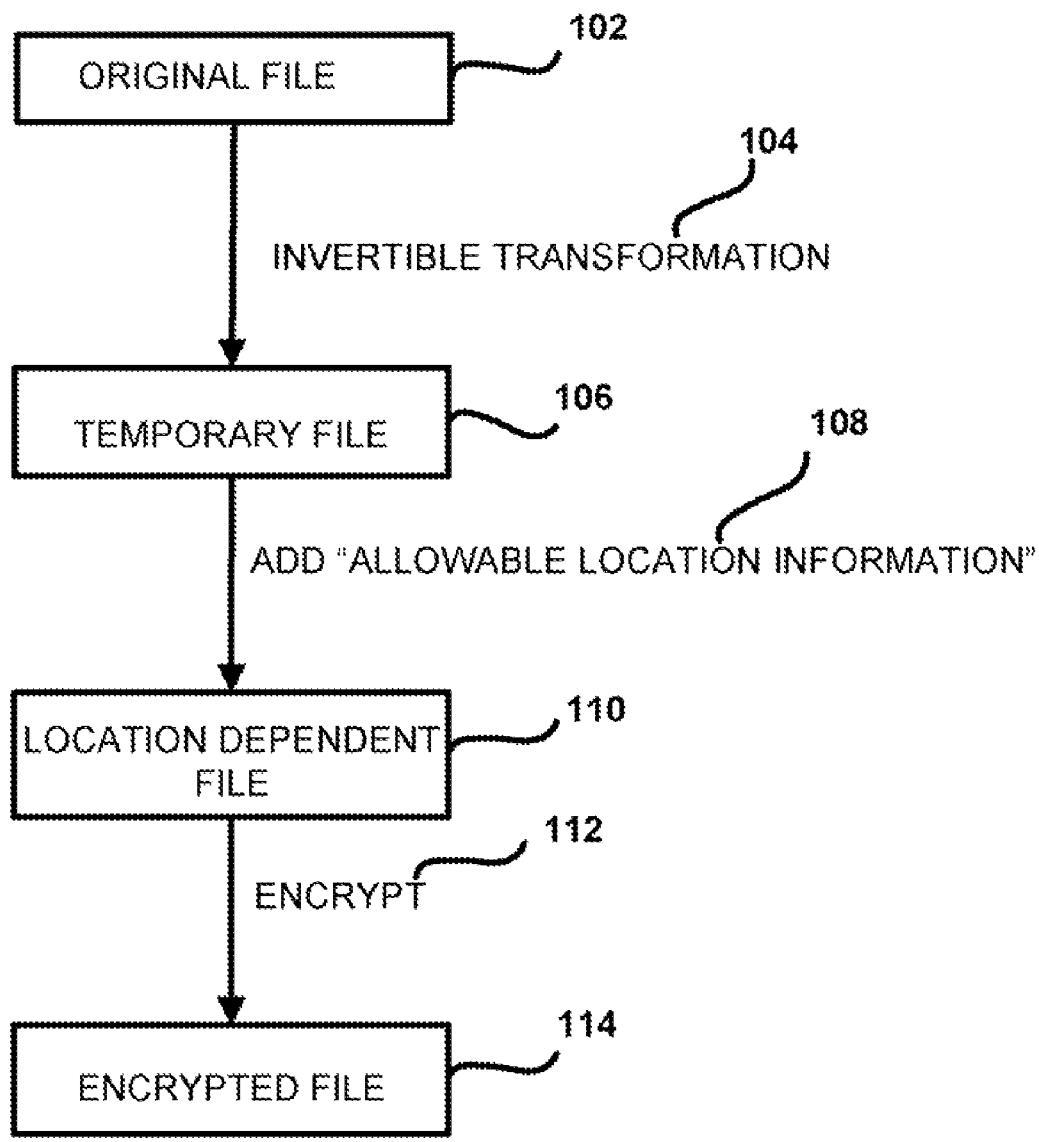
FIG. 1 illustrates, in accordance with an embodiment of the present invention, an example confidential data protection arrangement employing GPS location information and invertible transformation.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention. As will be appreciated from this disclosure, such apparatus may include, in an embodiment, a general-purpose computer that at least 1) is operatively coupled with GPS receiving circuitry to receive GPS location data and 2) logic to compare GPS location information and to encrypt/decrypt or transform/invert-transform data.

Embodiments of the invention relate to apparatus and methods for providing secure and efficient data protection employing one or both of allowable location information, for example, Global Positioning System (GPS) location information, and/or invertible data encryption protection to control access to the protected data. As is known, the GPS system includes a plurality of satellites that orbits the Earth and provides GPS signals to GPS receivers. A GPS receiver then employs the signals transmitted by the satellites to determine the receiver's location. By employing GPS signal receiving circuitry, one can pinpoint any geographic location to a high degree of accuracy.

In one or more embodiments of the invention, allowable location information, for example, GPS location information, may be embedded in a file that contains the data intended to be kept confidential. This allowable location information may then be employed to assist in protecting the confidential data. In one or more embodiments, the allowable location information is specified as an allowable location range. By way of example, an allowable location range may be specified by a latitude value +/− a latitude scope value, along with a longitude value +/− a longitude scope value. The latitude scope value and the longitude scope value may be small values to restrict the size of the allowable range or large values to specify a larger area within which the file containing the confidential data may be opened.

When a user attempts to employ a computer to open a file that is protected using the allowable location information, the computer compares its own GPS location, using location data obtained from a GPS signal receiving circuit, with the allowable location information embedded in the protected file. If the two locations do not intersect, the protected file can not be opened, thereby preventing the confidential data from being read. On the other hand, if the GPS location information of the computer system employed to open the confidential data intersects (e.g., overlaps or is located within) the location specified by the allowable location information that is embedded in the protected file, the protected file can be opened, thereby enabling the user to access the confidential data.

In one or more embodiments, the confidential data is protected using an invertible transformation (e.g., invertible mathematic) of the confidential data to generate an invertibly transformed file. The invertibly transformed file is unreadable except by a computer that is equipped with an appropriate invertible transformation engine, which invertible transformation engine is invoked only if the location of that computer intersects the allowable location information embedded in the protected file.

To protect, the allowable location information from being tampered with and/or modified by an unauthorized user, the allowable location information may be rendered tamper-proof in one or more embodiments. Tamper-proofing may involve, for example, encrypting the allowable location information such that the allowable location information is unreadable by an unauthorized user while remaining readable by a properly equipped computer employed to open the protected file containing the confidential data. Tamper-proofing may also involve technologies designed to provide an indication or an alert if the allowable location information has been tampered with. To provide further protection, the composite file that includes the invertibly transformed confidential data and the tamper-proof allowable location information may be encrypted again, in one or more embodiments.

The features and advantages of the invention may be better understood with reference to the figures and discussions that follow. FIG. 1 shows, in accordance with an embodiment of the present invention, an original file 102, a temporary file 106, a location dependent file 110, and an encrypted file 114, representing various files of an example confidential data protection technique employing GPS location information and invertible transformation.

By employing invertible transformation (104), original file 102 is transformed into a temporary file 106. Generally speaking, the invertible transformation may employ any type of transformation or encryption that can be inverted to retrieve the original file by appropriate logic if the invertibly transformed file is disposed in the geographic area specified by the allowable location information. For example, keywords, passwords, or RC4 mathematical manipulation, various types of encryption, etc., may be employed.

Once original file 102 is transformed into temporary file 106, GPS location information 104 is then embedded (108) with temporary file 106, for example, within the metadata of temporary file 106 or appended to temporary file 106 or added to temporary file 106. GPS location information 104 may include, latitude, longitude, latitude scope, and longitude scope to specify the allowable location range. As mentioned, the GPS allowable location information may be tamper-proofed, in one or more embodiments, to prevent an unauthorized user from circumventing the protection by modifying the GPS allowable location information to match the GPS location information of the computer system being employed to open the protected file.

Once the allowable location information is added to temporary file 106, the composite file that contains both the transformed confidential data (e.g., temporary file 106) and the allowable location information (e.g., the tamper-proofed GPS allowable location information) is referred to herein as a location dependent file. In FIG. 1, this location dependent file is shown by reference number 110. To provide an additional layer of protection, location dependent file 110 may be encrypted again (112) to produce encrypted file 114. Location dependent file 110 or encrypted file 114 represents the file that is unreadable by an unauthorized person except when using a properly equipped computer that is disposed in the area specified by the allowable location information.

Figure 2:
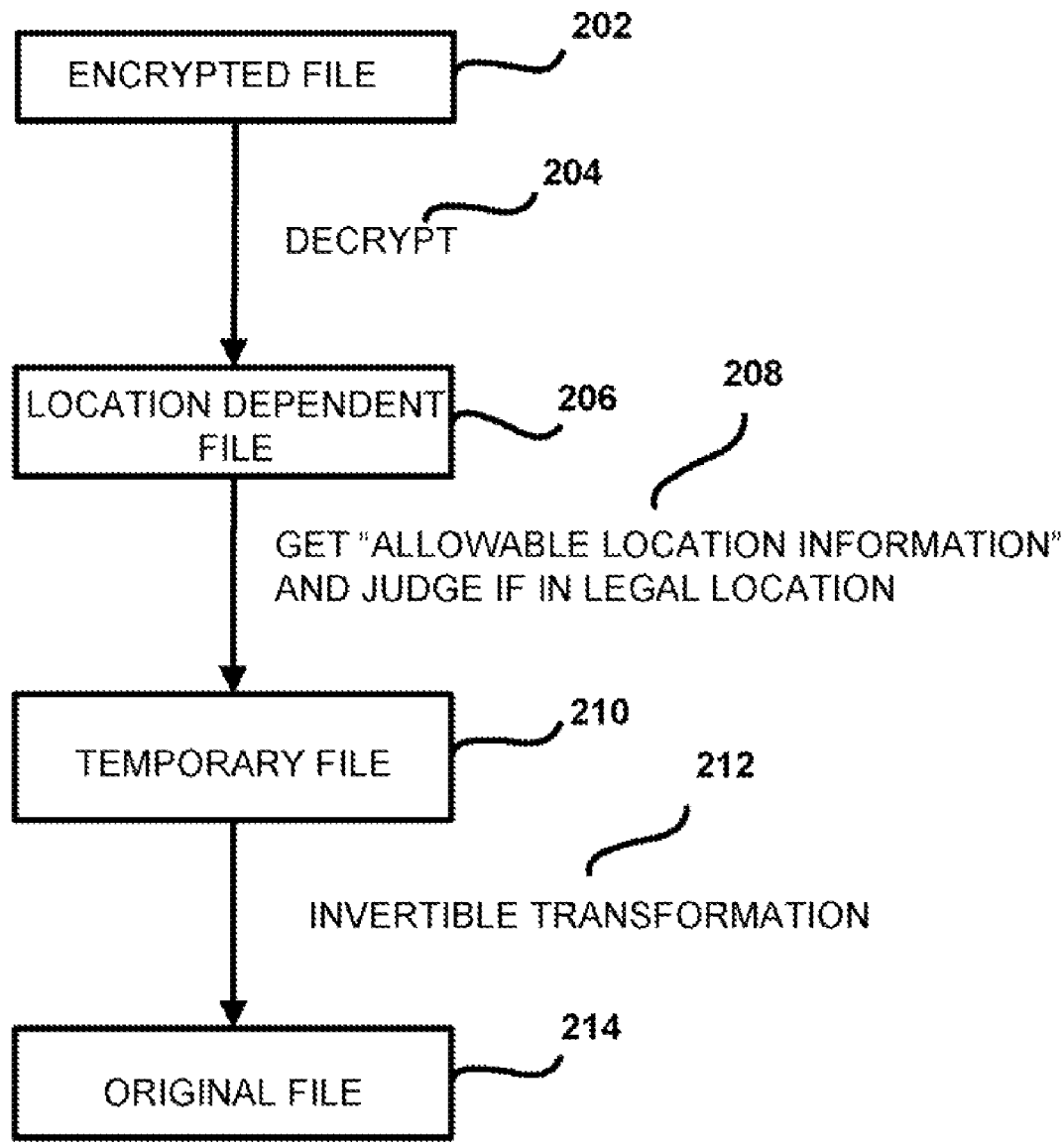
FIG. 2 shows, in accordance with an embodiment of the present invention, an example of a confidential data protection arrangement wherein a protected file can be opened if it is located in the geographic area specified by the allowable location information.

FIG. 2 shows, in accordance with an embodiment of the present invention, an example of a confidential data protection. arrangement involving an encrypted file 202, a location dependent file 206, a temporary file 210, and an original file 214. As show in FIG. 2, encrypted file 202 is acquired by a user, for example, a company employee or an organization administrator. When the user receives encrypted file 202, encrypted file 202 is unreadable except by using a properly equipped computer that is disposed in the geographic location specified by the allowable location information.

As a first step in reading the confidential information, encrypted file 202 is decrypted (204) to produce location dependent file 206. If the user is not an authorized user, this is a strong likelihood that the user would not have the appropriate equipment and/or expertise to decrypt encrypted file 202 into location dependent file 206. Decryption may require the user to enter an optional password or a security key, for example. Thus, the encryption furnishes an additional layer of protection beyond those provided by rendering the allowable location information tamper-proof and invertibly transforming the confidential data.

Even if the user can decrypt encrypted file 202 into location dependent file 206, the allowable location information embedded with the location dependent file 206 may be protected by a tamper-proofing scheme such as encryption and/or check-sum, for example. Thus, the unauthorized user is inhibited from circumventing the protection scheme by accessing and/or performing an unauthorized modification of the allowable location information to match the location of the computer being employed to read the confidential information. In this manner, the tamper-proofing of the allowable location information provides an additional layer of protection against unauthorized access.

A properly equipped computer then reads the tamper-proofed allowable location information (208) from location dependent file 206 and ascertains the allowable location information. If that computer is disposed within the geographic area specified by the allowable location information (determined by comparing the computer's own location obtained from GPS receiving circuitry against the allowable location information), an invertible transformation engine is invoked to transform (212) at least temporary file 210 portion of location dependent file 206 into original file 214. Note that unless the allowable location information condition is satisfied, temporary file 210 remains unreadable since the invertible transformation engine is not invoked. In this manner, the original confidential data is protected against unauthorized access unless the access is performed by a person having the proper authorization, using a properly equipped computer that is located in the area specified by the allowable location information.

Figure 3:
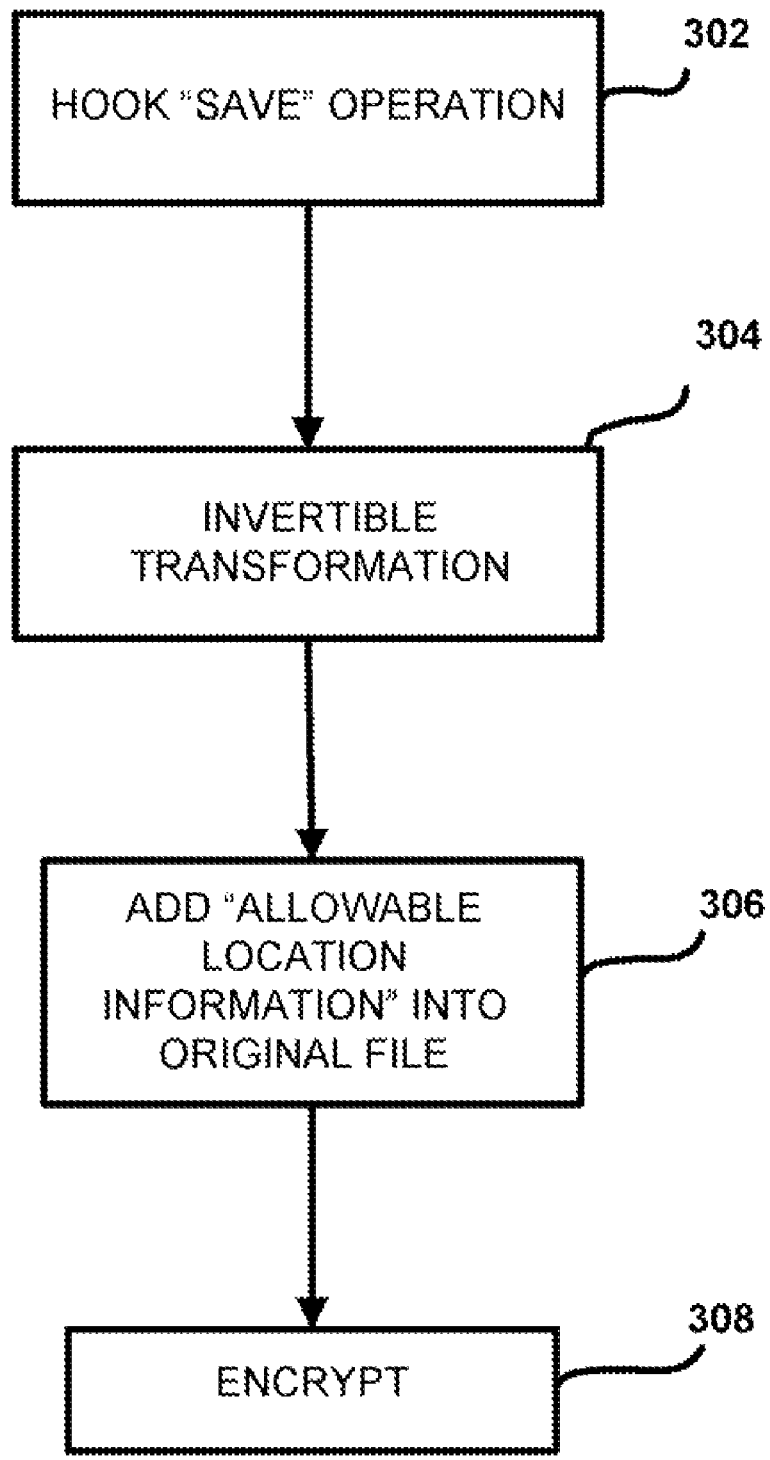
FIG. 3 shows, in accordance with another embodiment of the present invention, an example of a confidential data protection method involving a hook save operation and allowable location information.

FIG. 3 shows, in accordance with an embodiment of the present invention, an example of a confidential data protection method involving a hook save operation 302, an invertible arithmetic transformation 304, a step of adding allowable location information with temporary file 306, and a step of encrypting 308. As shown in FIG. 3, hook save operation 302 may be employed on a confidential data file automatically to initialize the process of protecting the confidential data file. The hook save operation involves using an appropriate software hook to monitor invoked save operations (e.g., when a user saves a file or document) and hooks or initiates the steps of FIG. 3 to provide protection for the confidential data. In some embodiment, the software hook automatically protects all saved documents. In this manner, the hook save operation may be thought of as an operation that snoops the user's normal save operation to provide protection in a substantially transparent manner to the user data.

In another embodiment, the software hook is invoked only when the user employs a special save command (e.g., by using a designated sequence key strokes or by clicking on a special icon). In another embodiment, the software hook, when invoked, provides the user with a choice to either save the document with protection or without protection as is done conventionally. In another embodiment, a user, for example, a company employee, may manually employ one or more of the steps of FIG. 3 to protect a specific file.

Once the protection process is initialized either automatically, for example, hook save operation 302, or manually, invertible arithmetic transformation 304 is then employed to transform original file 102 (as shown in FIG. 1) into a temporary, file 106 (as shown in FIG. 1).

Once original file 102 is transformed into temporary file 106, the step of adding allowable location information to temporary file (306) may be employed. Allowable location information may be embedded, for example, within the metadata of temporary file 106 or appended to temporary file 106 or simply added in a designated location in temporary file 106. As mentioned, to inhibit an unauthorized user from circumventing the protection by accessing and/or modifying the allowable location information to match the location information of the computer system being employed to open the protected file, the allowable location information may be tamper-proofed, for example, by encryption protection or by a check-sum technique or a suitable tamper-detection technique.

Once the allowable location information is added to temporary file 106, the composite file that contains both the temporary tile 106 and the allowable location information is referred to herein as a location dependent file (110 as shown in FIG. 1). Location dependent file 110 may be encrypted (308) again to produce encrypted file (114 as shown in FIG. 1) to provide an additional layer of protection.

Figure 4:
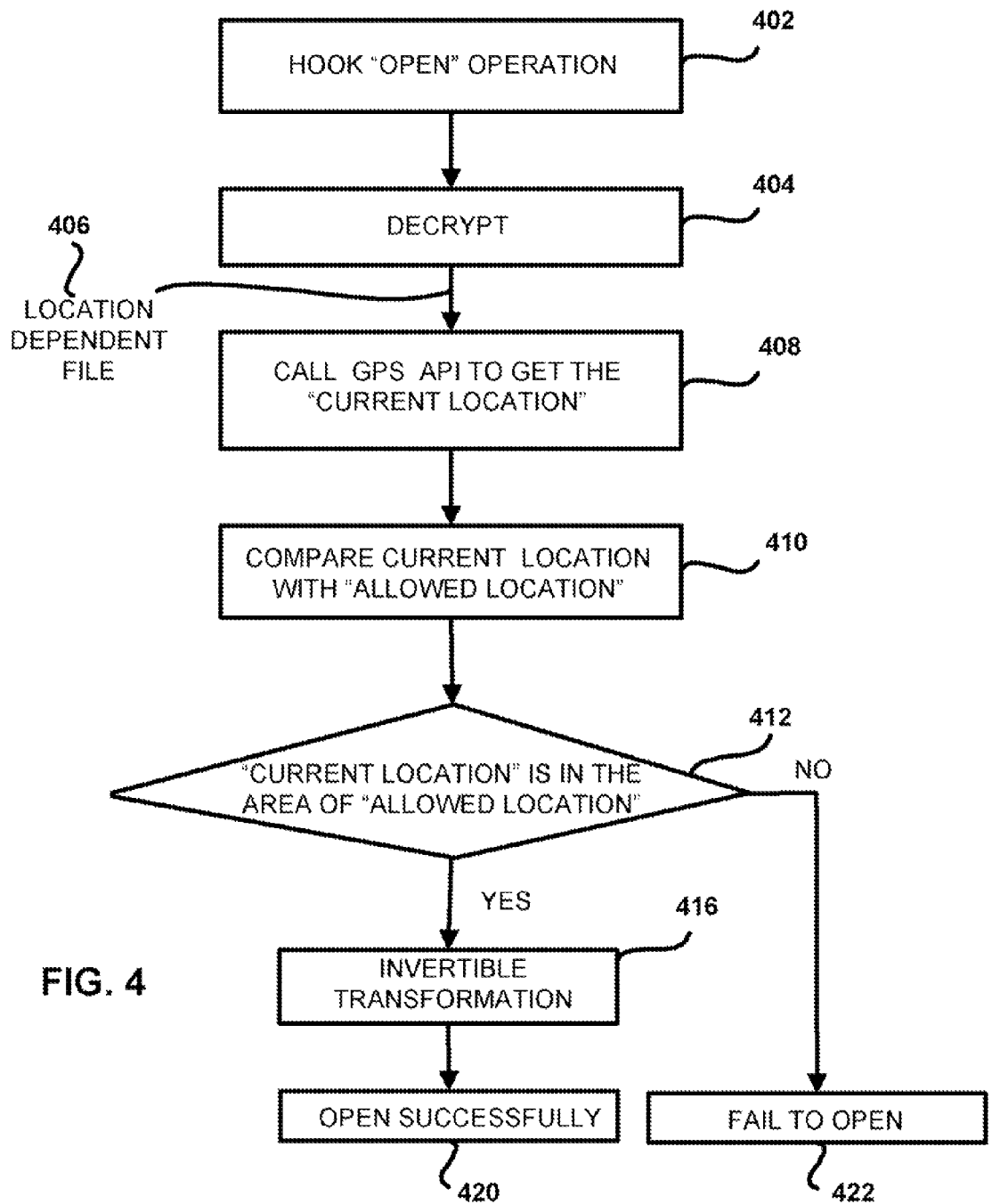
FIG. 4 shows, in accordance with an embodiment of the present invention, in greater details an example of a confidential data protection arrangement involving a hook "open" operation and allowable location information.

FIG. 4 shows, in accordance with an embodiment of the present invention, in greater details an example of a confidential data protection arrangement involving a hook "open" operation 402, a decryption step 404, a step of calling GPS API to get the "current location" (408), a step to compare current location with allowable location information (410), an invertible transformation 416. As shown in FIG. 4, encrypted file 202 (as shown in FIG. 2) is acquired by a user, for example, a company employee or an organization administrator. When the user receives encrypted file 202, encrypted file 202 is unreadable except by using a properly equipped computer that is within the geographic location specified by the allowable location information.

As a first step in reading the confidential information, encrypted file 202 may be opened by employing hook "open" operation (402). Hook "open" operation 402 may be employed on a confidential data file automatically to initialize the process of reading the confidential data file. Likewise, a user, for example, company employee or organization may employ one or more of the steps of FIG. 4 to read the confidential data file manually.

Once the reading process is initialized either automatically, for example, hook "open" operation 402, or manually, encrypted file 202 may be decrypted (404) to produce location dependent file 406. If the user is not an authorized user, this is a strong probability that the user would not have suitable equipment and/or knowledge to decrypt encrypted file 202 into location dependent file 406. For example, decryption may require the user to enter an optional password or security key. As mentioned, even if the user can decrypt encrypted file 202 into location dependent file 406, the allowable location information embedded with the location dependent file 206 may be protected by a tamper-proofing scheme such as encryption and/or check-sum, for example.

A properly equipped computer then reads the tamper-proofed allowable location information from location dependent file 406 and calls GPS API to get the "current location" (408) of the GPS receiving circuitry that is associated with the computer employed to read encrypted file 202. The GPS-equipped computer subsequently ascertains whether the encrypted file can be opened based on the geographic information obtained from its own GPS receiving circuitry and the embedded allowable location in the protected file. In an embodiment, this determination is made by comparing (410) the "current location" with the allowable location information.

If the computer is within the geographic area specified by the allowable location information (the "Yes" path out 412), an invertible transformation engine is invoked (416) to transform at least temporary file 210 portion of location dependent file 406 into original file (214 as shown in FIG. 2). In this case, the protected tile is deemed successfully read (420).

Likewise, if the computer is not within the geographic area specified by the allowable location information, the original file 214 will not open and will remain unreadable (422) since the invertible transformation engine cannot be invoked.

In an embodiment, GPS signal extending technologies (using for example range-extending transmitters) may be employed to allow a computer attempting to open such protected files to operate in locations where GPS signals are weakened (such as indoors or inside buildings).

As can be appreciated from the foregoing, embodiments of the invention allow an enterprise or an individual to protect confidential data without resorting to intrusive searches of other humans or on fallible data protection policies that depend on human compliance and diligence. By using universally available GPS signals for determining whether a file is located in a geographic location where access to the confidential data within that data is authorized, a secure, always-available, and un-intrusive protection arrangement is achieved.

While this invention has been described in terms of several embodiments, there are alterations, permutations, and equivalents, which fall within the scope of this invention. It should also he noted that there are many alternative ways of implementing the methods and apparatuses of the present invention. For example, although the discussion herein focuses on protecting documents and files generated by a user, the data protection technique discussed herein is readily applicable to any situation wherein a decision whether to allow access to data of a file or a group of files is required. As an example, the data protection technique discussed herein is readily applicable to digital rights management needs wherein a publisher or a producer of an audio and/or audio-visual work may wish to limit the right to listen and/or view the work to a particular location.

Further, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A computer-implemented method for providing protection for information of a data file, the method comprising:
    decrypting an encrypted file to produce a composite file, said composite file including said information of said data file and allowable location information, wherein said allowable location information defines an allowable geographic area within which said information of said data file is accessible;
    ascertaining said allowable location information from said composite file;
    after said decrypting, ascertaining a geographic location of a computer, said computer being employed to access said data file;
    determining whether to permit access by said computer to said information of said data file based on at least said allowable location information and said geographic location of said computer; and
    preventing said access by said computer to said information of said data file if said geographic location of said computer according to said ascertaining is not within said allowable geographic area.

2. A computer-implemented method for providing protection for information of a data file, the method comprising:
    decrypting an encrypted file to produce a composite file;
    ascertaining allowable location information from said composite file, said composite file being created from embedding said allowable location information with a temporary file, said temporary file being resulted from performing invertible transformation on said data file, said allowable location information specifying a geographic area within which said protected file is accessible;
    after said decrypting, ascertaining a geographic location of a computer, said computer being employed to access said protected file;
    determining whether to permit access by said computer to said information of said data file based on at least said allowable location information and said geographic location of said computer; and
    permitting said access by said computer to said information of said data file only if said geographic location of said computer according to said ascertaining is within said geographic area.

3. A method for providing protection for information in a data file, the method comprising:
    embedding said data file with allowable location information to create a composite file, wherein said allowable location information defines an allowable geographic area within which said information of said data file is accessible;
    after said embedding, encrypting said composite file to create an encrypted file;
    decrypting said encrypted file into said composite file;
    ascertaining said allowable location information from said composite file;
    after said decrypting, ascertaining a geographic location of a computer, said computer being employed to access said data file;
    determining whether to permit access by said computer to said information of said data file based on at least said allowable location information and said geographic location of said computer; and
    preventing said access by said computer to said information in said data file if said geographic location of said computer according to said ascertaining is not within said allowable geographic area defined by said allowable location information.

4. The computer-implemented method of claim 1 further comprising comparing said geographic location of said computer with said allowable location information.

5. The method of claim 1 wherein said allowable geographic area is specified by a latitude value, a longitude value, a latitude scope, and a longitude scope.

6. The method of claim 1 further comprising:
    transforming said data file into a temporary file by performing invertible transformation on said data file; and
    embedding said allowable location information in metadata of said temporary file.

7. The method of claim 1 further comprising tamper-proofing said allowable location information before creating said composite file, to prevent unauthorized modification to said allowable location information.

8. The method of claim 2 further comprising comparing said geographic location of said computer with said allowable location information.

9. The method of claim 2 wherein said allowable geographic area is specified by a latitude value, a longitude value, a latitude scope, and a longitude scope.

10. The method of claim 2 further comprising tamper-proofing said allowable location information before creating said composite file, to prevent unauthorized modification to said allowable location information.

11. The method of claim 3 further comprising comparing said geographic location of said computer with said allowable location information.

12. The method of claim 3 wherein said allowable geographic area is specified by a latitude value, a longitude value, a latitude scope, and a longitude scope.

13. The method of claim 3 further comprising tamper-proofing said allowable location information before creating said composite file, to prevent unauthorized modification to said allowable location information.

14. The method of claim 3 wherein said embedding including embedding said allowable location information in metadata of said temporary file.

15. The method of claim 3 further comprising, after ascertaining that said computer is disposed within said allowable geographic area, invoking an invertible transformation engine to transform a temporary file into said data file.

16. The method of claim 3 further comprising monitoring for a save operation on said data file, said save operation being performed by a user who opened said data file earlier.

17. The method of claim 3 further comprising including Global Positioning System (GPS) information in said allowable location information.

18. The method of claim 3 further comprising specifying said allowable geographic area using at least one of a latitude value, a longitude value, a latitude scope, and a longitude scope.

19. The method of claim 16 further comprising performing said embedding upon detecting said save operation.

* * * * *